Patented Dec. 1, 1936

2,062,823

UNITED STATES PATENT OFFICE 2,062,823

WEED KILLING COMPOSITIONS

Anderson W. Ralston and Carl W. Christensen, Chicago, Ill., assignors to Armour and Company, Chicago, Ill., a corporation of Illinois No Drawing. Application November 29, 1935, Serial No. 52,275

14 Claims. (Cl. 167—45)

This invention relates to weed killing compositions and it comprises, as a new weed killer a mercurated fatty acid substance chosen from the group consisting of fatty acids and aliphatic esters thereof, the mercurated fatty acid compound containing the group:

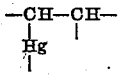

and it further comprises weed killing compositions wherein such mercurated compounds are dissolved in solvents therefor, or emulsified in aqueous solutions to give liquid products which can be sprayed.

The extermination of weeds such as dandelions, thistles, and other milk or latex containing weeds has been a long standing problem. Many herbicides or weed killing compositions have been proposed. Generally the products hitherto suggested have been inorganic poisons such as various inorganic compounds of mercury. Although some of these compounds are effective to dry up the plant, practically none of them attack the roots and actually destroy all evidence of the weed. Along railway rights-of-way the weed problem is a serious one. Many herbicide compositions can be used for this type of weed control with a degree of effectiveness, although the weeds practically always grow back and must be re-sprayed with the weed killer. Most of these weed-killers are of practically no utility in the case of lawns because not only is the weed itself temporarily dried up, but most of the surrounding grass desired to be preserved is also destroyed. This means that weed control in lawns, parks, and similar places must be handled by mechanical means. That is to say the whole weed, such as the dandelion, must be cut out of the grassy area.

As stated, the eradication of dandelions and similar kinds of weeds has been a long standing problem and no satisfactory solution has hitherto been proposed. What the art has desired is some sort of chemical which could be sprayed or otherwise applied to the weed, and which would completely destroy the weed and its roots without affecting surrounding grass. We have set ourselves to this problem and we have discovered a class of compounds which will achieve these long desired results. We have discovered that certain mercury derivatives of fats, fatty acids, or fatty acid esters are effective weed killers. We have found that these compounds completely destroy the root of the weed without having any serious effect on the surrounding grass it is desired to preserve. In some cases the grass may appear to be attacked slightly by the materials we use but grass roots are not killed and the grass readily grows again. On the other hand, the weeds, such as dandelions, are completely destroyed and the root substance of the weed is so dried up or "burned out" that the weed no longer grows.

We have found that the weed killers of the present invention are specific for the removal of weeds having milk or latex containing roots, such as those belonging to the family of Compositae which includes thistles, dandelions, sunflowers; or those belonging to the family Asclepiadaceae which includes milkweeds. We have also found them to be useful in the control of weeds belonging to the genus Plantago which includes the commonly called plantain weed, but they are not as effective with this group as with those having milk or latex containing roots. It is our belief that the root systems of the weeds which we have mentioned possess a specific affinity for the type of mercury derivatives we use, and that when these mercury compounds are sprayed upon the soil the root system of the weed specifically absorbs the compound thus resulting in the death of the root system. We attribute the non-destructive effect of our compounds upon grasses and other monocotyledonous plants to the fact that their root systems, being essentially different from those of the above mentioned weeds, do not possess the ability to absorb these compounds. Thus we are enabled to kill the root system of a weed without seriously affecting the grass in close proximity.

The compounds which comprise our weed killers can be generically defined as substances prepared by mercurating unsaturated fats, or alkyl esters of unsaturated fatty acids with mercury compounds capable of reacting in such a manner that the mercury is linked to the unsaturated fat at the point of unsaturation. In broadest aspects the reaction can be written in the following manner:

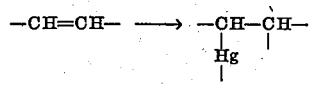

In the above reaction the unsaturated portion of the fat or aliphatic ester of an unsaturated fatty acid reacts with the mercury compound so that the mercury, in a sense, saturates the unsaturated double bond. Hence these mercurated compounds are not to be confused with mercury soaps such as ethyl mercury oleate. Many of the compounds which we use are old per se, they having been described in U. S. Patent 1,012,923 together with methods of preparation. But we are the first to discover the remarkable efficacy of these mercuated materials as weed killers.

It will be apparent that the compounds of the present invention can be made from many different starting materials. For example, we can start with unsaturated fats such as triolein and other glycerides of unsaturated fatty acids. We can start with the simple alkyl esters of the unsaturated fatty acids such as ethyl oleate. Our final products can be mercurated fatty acids, rather than esters thereof, but when we wish to use the mercurated fatty acids we find it best to start with either an unsaturated fat or an alkyl ester of an unsaturated fatty acid, mercurate the unsaturated compound and then saponify the mercurated esters to obtain the free mercurated fatty acid.

Generally we dissolve our mercurated compounds in any suitable solvent such as alcohol, naphtha, kerosene, benzene, and the like. A solution in which the mercurated compound amounts to but .001 to .01 percent is strong enough because of the extreme toxicity of our compounds. Such solutions can be readily prepared and readily sprayed upon grassy areas containing dandelions and similar weeds. Although higher concentration can be employed we do not find it ordinarily necessary.

We shall now describe ways of making our weed killing compounds. One of the most advantageous starting materials is ethyl oleate. We dissolve about 500 parts by weight of ethyl oleate in about 500 parts by weight of methyl alcohol and then add about 543 parts by weight of mercuric acetate. This mixture is then stirred under a reflux condenser and heated so that the methyl alcohol refluxes. Heating and refluxing is continued for about 3 to 5 hours until the mercuric acetate completely disappears. This is shown by the reaction mixture becoming transparent. At the conclusion of the reaction the mixture is diluted with water and the heavy oil layer, which is thus separated and collects as a lower layer, is washed with water until no test for mercury is obtained in the washings. The final product, which is ethyl 9-acetoxy mercuri, 10-methoxy stearate, is a clear yellowish oil heavier than water.

The reaction in this example is as follows:

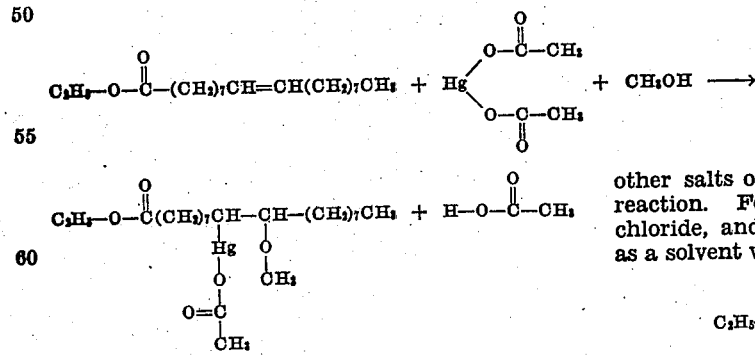

The theoretical percentage of mercury in this compound is 34.2 percent and the product obtained by us contains 33.8 percent. This compound is very soluble in organic solvents, such as alcohol, ether, naphtha, kerosene, benzene, etc., and we have found that .001 to .01 percent concentrations of these solutions are extremely toxic to weeds. As stated, higher concentrations may be employed but it has been our experience that it is not necessary in the ordinary cases to exceed these limits.

Instead of using methyl alcohol we can of course use many other alcohols such as ethyl, propyl, and butyl. When this is done, the final compound will be in part a 10-ethoxy stearate, when ethyl alcohol is used, instead of a 10-methoxy stearate. The weed killing power is essentially the same regardless of the alcohol used.

In fact we can use water as a solvent in the reaction and in this case the final compound contains a hydroxy instead of a methoxy group. Thus ethyl oleate, if refluxed for a prolonged period of time with a water solution of mercuric acetate gives, as a final product, ethyl 9-acetoxy mercuri 10-hydroxy stearate. These hydroxy derivatives are also efficacious dandelion killers but they are somewhat more difficult to synthesize because of the fact that ethyl oleate is insoluble in the water solution of mercuric acetate and long refluxing is necessary to complete the reaction.

Instead of using ethyl oleate as a starting material we can use triolein and many other glycerides of unsaturated fatty acids. Likewise we can use highly unsaturated esters and but partially mercurate them by restricting the quantity of mercuric compound used. Thus we can start with unsaturated fats containing two or more double bonds and partially "saturate" the double bonds with mercury.

We are not limited to the use of ethyl esters since any aliphatic esters, such as isopropyl, amyl, butyl, and others can be used.

As noted above, we sometimes use weed killing solutions containing mercurated free fatty acids. When we wish to prepare these compounds we find it advantageous to start with an ester, such as ethyl oleate as in the example given above, and then, after forming a mercurated ester saponify or otherwise treat the ester to liberate the free mercurated fatty acid.

Very desirable starting materials are unsaturated oils or fats such as cotton seed oil, sardine oil lard, and other substances containing large quantities of unsaturated compounds reactive with mercuric compounds.

In the above example, we have referred more specifically to the use of mercuric acetate. Instead of using this substance we can use mercuric chloride, mercuric iodide, mercuric nitrate, and other salts of mercury operative in this type of reaction. For example, when using mercuric chloride, and ethyl oleate, with methyl alcohol as a solvent we obtain as a final product:

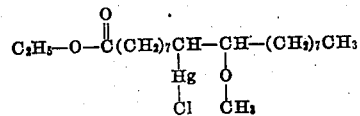

In our compounds the reactive weed killing portion of the molecule is most probably the atomic group:

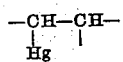

It does not particularly matter what the mercury may be additionally linked to. Apparently this specific atomic linkage has a specific action on weeds of the dandelion type.

As stated above, when preparing our weed killing compositions for use, we ordinarily find it most advantageous to simply dissolve the mercurated compound in a suitable solvent a number of which we have mentioned above. For some purposes it may be desirable to emulsify small amounts, most always less than 1 percent, of the mercurated compound in an aqueous solution. We can, for example, prepare spraying compounds containing 99 percent of water, about 0.5 percent of an emulsifying agent such as soap, bentonite and other typical emulsifying agents for suspending solids in water, and about 0.5 percent of the mercurated compounds we disclose herein.

For still other purposes it may be desirable to dispense our compositions in the form of dry powders. We can, for example, prepare mixtures containing 99.5 percent of inert solids such as ground up pumice, talc and the like, associated with about 0.5 percent of the mercurated compound. Such powders can be dusted on the weed area.

Having thus described our invention, what we claim is:

1. A weed killing composition comprising a mercurated fatty substance chosen from the group consisting of fatty acids and aliphatic esters thereof and containing as a part of the carbon chain in the alkyl radical of the fatty acid or the fatty acid radical of said ester, the linkage:

$$-\text{CH}-\text{CH}-$$
$$\phantom{-\text{CH}-}|\phantom{\text{CH}-}|$$
$$\phantom{-\text{CH}-}\text{Hg}$$

2. A weed killing composition comprising a mercurated fatty substance chosen from the group consisting of fatty acids and aliphatic esters thereof and containing as a part of the carbon chain in the alkyl radical of the fatty acid or the fatty acid radical of said ester, the linkage:

$$-\text{CH}-\text{CH}-$$
$$\phantom{-\text{CH}-}|\phantom{\text{CH}-}|$$
$$\phantom{-\text{CH}-}\text{Hg}$$

and a liquid vehicle for said mercurated substance.

3. A weed killing composition comprising a mercurated fatty substance chosen from the group consisting of fatty acids and aliphatic esters thereof and containing as a part of the carbon chain in the alkyl radical of the fatty acid or the fatty acid radical of said ester, the linkage:

$$-\text{CH}-\text{CH}-$$
$$\phantom{-\text{CH}-}|\phantom{\text{CH}-}|$$
$$\phantom{-\text{CH}-}\text{Hg}$$

dissolved in an organic solvent therefor.

4. The composition as in claim 3 wherein the solvent is kerosene and the amount of mercurated substance is about .001 to .1 percent.

5. A weed killing composition comprising a mercurated stearic substance chosen from the group consisting of stearic acid and aliphatic esters thereof and containing as a part of the carbon chain in the alkyl radical of the fatty acid or the fatty acid radical of said ester, the linkage:

$$-\text{CH}-\text{CH}-$$
$$\phantom{-\text{CH}-}|\phantom{\text{CH}-}|$$
$$\phantom{-\text{CH}-}\text{Hg}$$

6. A weed killing composition comprising a mercurated stearic substance chosen from the group consisting of stearic acid and aliphatic esters thereof and containing as a part of the carbon chain in the alkyl radical of the fatty acid or the fatty acid radical of said ester, the linkage:

$$-\text{CH}-\text{CH}-$$
$$\phantom{-\text{CH}-}|\phantom{\text{CH}-}|$$
$$\phantom{-\text{CH}-}\text{Hg}$$

and a liquid vehicle for said mercurated substance.

7. A weed killing composition comprising a mercurated stearic substance chosen from the group consisting of stearic acid and aliphatic esters thereof and containing as a part of the carbon chain in the alkyl radical of the fatty acid or the fatty acid radical of said ester, the linkage:

$$-\text{CH}-\text{CH}-$$
$$\phantom{-\text{CH}-}|\phantom{\text{CH}-}|$$
$$\phantom{-\text{CH}-}\text{Hg}$$

dissolved in an organic solvent.

8. The composition as in claim 7 wherein the solvent is kerosene and the amount of mercurated substance is about .001 to .1 percent.

9. A weed killing composition comprising ethyl 9-acetoxy mercuri 10-methoxy stearate.

10. A weed killing composition comprising ethyl 9-acetoxy mercuri 10-methoxy stearate and a liquid vehicle therefor.

11. A weed killing composition comprising ethyl 9-acetoxy mercuri 10-methoxy stearate dissolved in an organic solvent therefor.

12. A weed killing composition comprising a .001 to about 0.1 percent solution in kerosene of ethyl 9-acetoxy mercuri 10-methoxy stearate.

13. The process of destroying weeds of the dandelion type which comprises spraying areas containing such weeds with a solution of a mercurated fatty substance chosen from the group consisting of mercurated fatty acids and aliphatic esters thereof containing as a part of the carbon chain in the alkyl radical of the fatty acid or the fatty acid radical of said ester, the linkage:

$$-\text{CH}-\text{CH}-$$
$$\phantom{-\text{CH}-}|\phantom{\text{CH}-}|$$
$$\phantom{-\text{CH}-}\text{Hg}$$

14. The process of destroying weeds of the dandelion type which comprises spraying areas containing such weeds with a solution of ethyl 9-acetoxy mercuri 10-methoxy stearate.

ANDERSON W. RALSTON.
CARL W. CHRISTENSEN.